(12) United States Patent
Pigeat

(10) Patent No.: US 7,731,457 B2
(45) Date of Patent: Jun. 8, 2010

(54) MACHINE TOOL WITH A PLATE WITH ELASTIC PROPERTIES FOR HOLDING THE CUTTER

(75) Inventor: Alain Pigeat, Saint de la Tour (FR)

(73) Assignee: Seco Tools AB, Fagersta (SE)

( * ) Notice: Subject to any disclaimer, the term of this patent is extended or adjusted under 35 U.S.C. 154(b) by 393 days.

(21) Appl. No.: 11/571,664

(22) PCT Filed: Jun. 29, 2005

(86) PCT No.: PCT/SE2005/001032

§ 371 (c)(1),
(2), (4) Date: Oct. 4, 2007

(87) PCT Pub. No.: WO2006/006914

PCT Pub. Date: Jan. 19, 2006

(65) Prior Publication Data

US 2008/0273929 A1  Nov. 6, 2008

(51) Int. Cl.
*B23B 29/02* (2006.01)
(52) U.S. Cl. ............... 408/187; 408/188; 408/233
(58) Field of Classification Search ............ 407/66, 407/101, 102, 104, 109, 110; 408/83.5, 713, 408/187, 188, 233
See application file for complete search history.

(56) References Cited

U.S. PATENT DOCUMENTS

| | | | | |
|---|---|---|---|---|
| 3,205,558 A | * | 9/1965 | Stier | 407/93 |
| 3,376,763 A | * | 4/1968 | Welles | 408/199 |
| 3,381,553 A | * | 5/1968 | Lutz | 408/168 |
| 3,410,160 A | * | 11/1968 | Le Barre | 408/153 |
| 3,534,457 A | * | 10/1970 | Mueller | 407/101 |
| 3,662,445 A | * | 5/1972 | Whitaker | 407/71 |
| 3,846,882 A | * | 11/1974 | Stein | 407/87 |
| 4,040,156 A | | 8/1977 | Tack | |
| 4,227,838 A | * | 10/1980 | Berry | 407/77 |
| 4,332,513 A | * | 6/1982 | Gowanlock | 407/101 |
| 4,531,867 A | * | 7/1985 | Benhase | 408/229 |
| 4,579,488 A | * | 4/1986 | Griffin | 409/136 |
| 4,580,930 A | * | 4/1986 | Zinner | 407/110 |
| 4,631,993 A | * | 12/1986 | Kelm | 82/1.11 |
| 4,693,641 A | * | 9/1987 | Tsujimura et al. | 407/42 |
| 4,938,641 A | * | 7/1990 | Maier | 407/110 |
| 5,112,164 A | * | 5/1992 | Pano | 407/110 |

(Continued)

FOREIGN PATENT DOCUMENTS

DE        135576 C        5/1979

(Continued)

OTHER PUBLICATIONS

International Search Report from corresponding International Application PCT/SE2005/001032.

*Primary Examiner*—Jason Daniel Prone
*Assistant Examiner*—Jennifer Swinney
(74) *Attorney, Agent, or Firm*—WRB-IP LLP

(57) ABSTRACT

A machine tool designed to be fitted with a cutter which is retained by a central screw includes a plate which is removable in relation to the body of the tool. The plate possesses a cut-out for the positioning of a machining cutter with a central hole, this cut-out having two lateral faces and a third face which bears elastically against the machining cutter.

12 Claims, 5 Drawing Sheets

U.S. PATENT DOCUMENTS

| | | | |
|---|---|---|---|
| 5,217,330 A * | 6/1993 | Dennstedt | 407/37 |
| 5,688,080 A * | 11/1997 | Hedlund | 407/101 |
| 5,704,742 A * | 1/1998 | Reinauer | 408/156 |
| 5,709,508 A * | 1/1998 | Barazani et al. | 407/101 |
| 5,735,649 A * | 4/1998 | Boscarino et al. | 408/153 |
| 6,186,704 B1 * | 2/2001 | Hale | 407/101 |
| 6,270,294 B1 * | 8/2001 | Sjoo et al. | 407/101 |
| 6,702,529 B1 | 3/2004 | Tagtstrom et al. | |
| 6,846,136 B2 * | 1/2005 | Brock et al. | 408/154 |
| 6,880,437 B2 * | 4/2005 | Sjoo et al. | 82/158 |
| 7,029,210 B2 * | 4/2006 | Schlagenhauf | 408/153 |
| 7,052,217 B2 * | 5/2006 | Johne | 408/156 |
| 7,217,068 B2 * | 5/2007 | Oettle | 407/101 |
| 7,275,894 B2 * | 10/2007 | Schlagenhauf et al. | 407/37 |
| 2006/0140730 A1 * | 6/2006 | Schlagenhauf et al. | 407/37 |

FOREIGN PATENT DOCUMENTS

| | | | |
|---|---|---|---|
| DE | 2854149 A * | 7/1980 | |
| DE | 3204693 A1 * | 8/1983 | |
| DE | 3316053 A1 * | 11/1984 | |
| DE | 3602427 A1 * | 7/1987 | |
| EP | 0568515 A1 | 11/1993 | |
| EP | 1226891 A1 | 7/2002 | |
| FR | 2094446 A | 2/1972 | |
| GB | 2165472 A * | 4/1986 | |
| JP | 01222803 A * | 9/1989 | |
| JP | 06190608 A * | 7/1994 | |

* cited by examiner

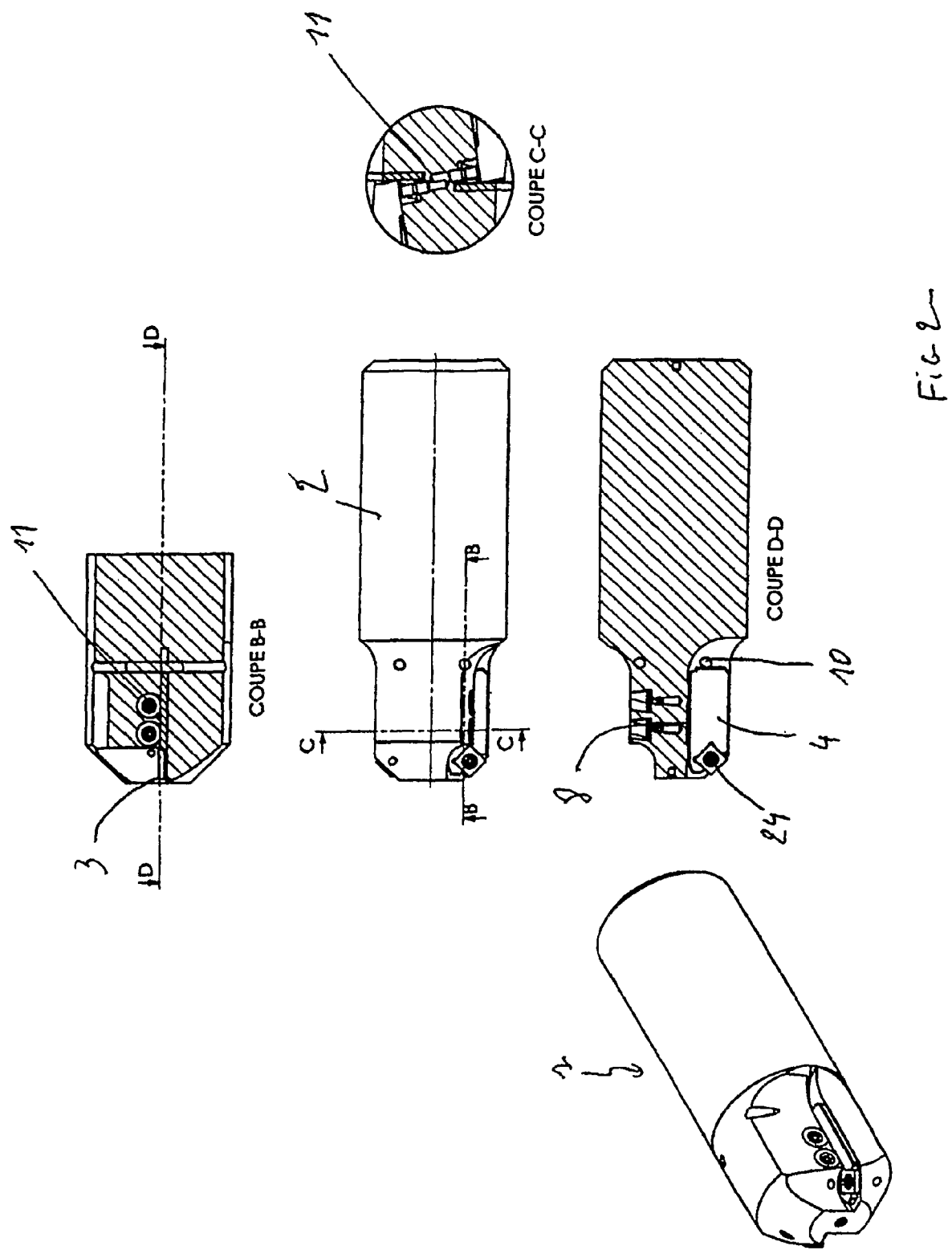

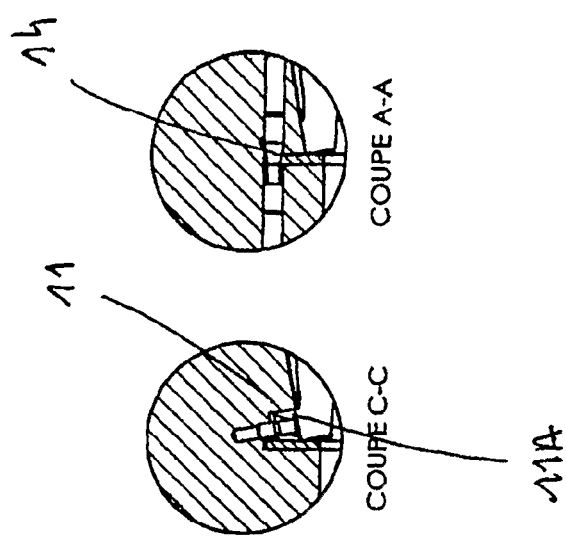
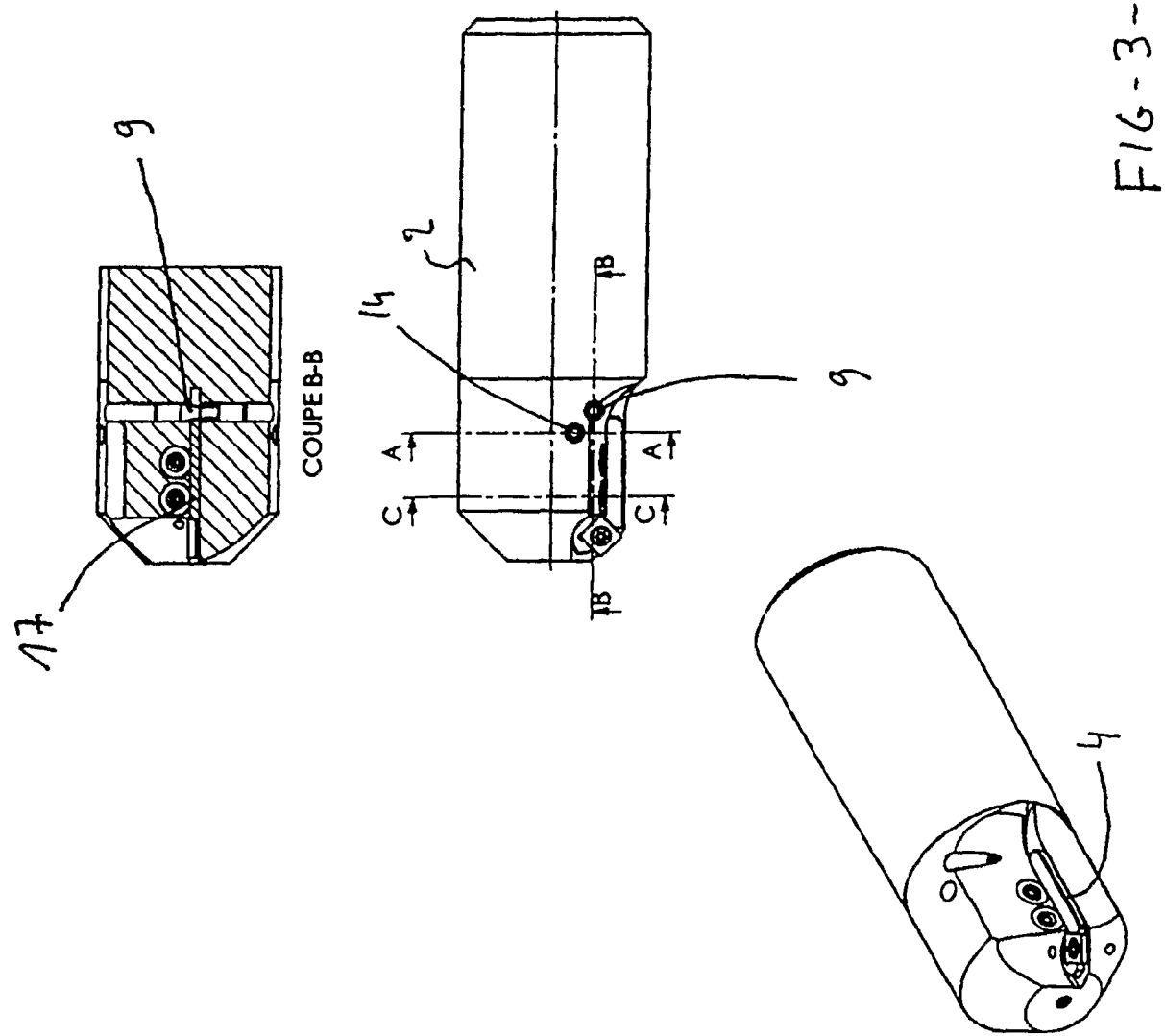
FIG-3-

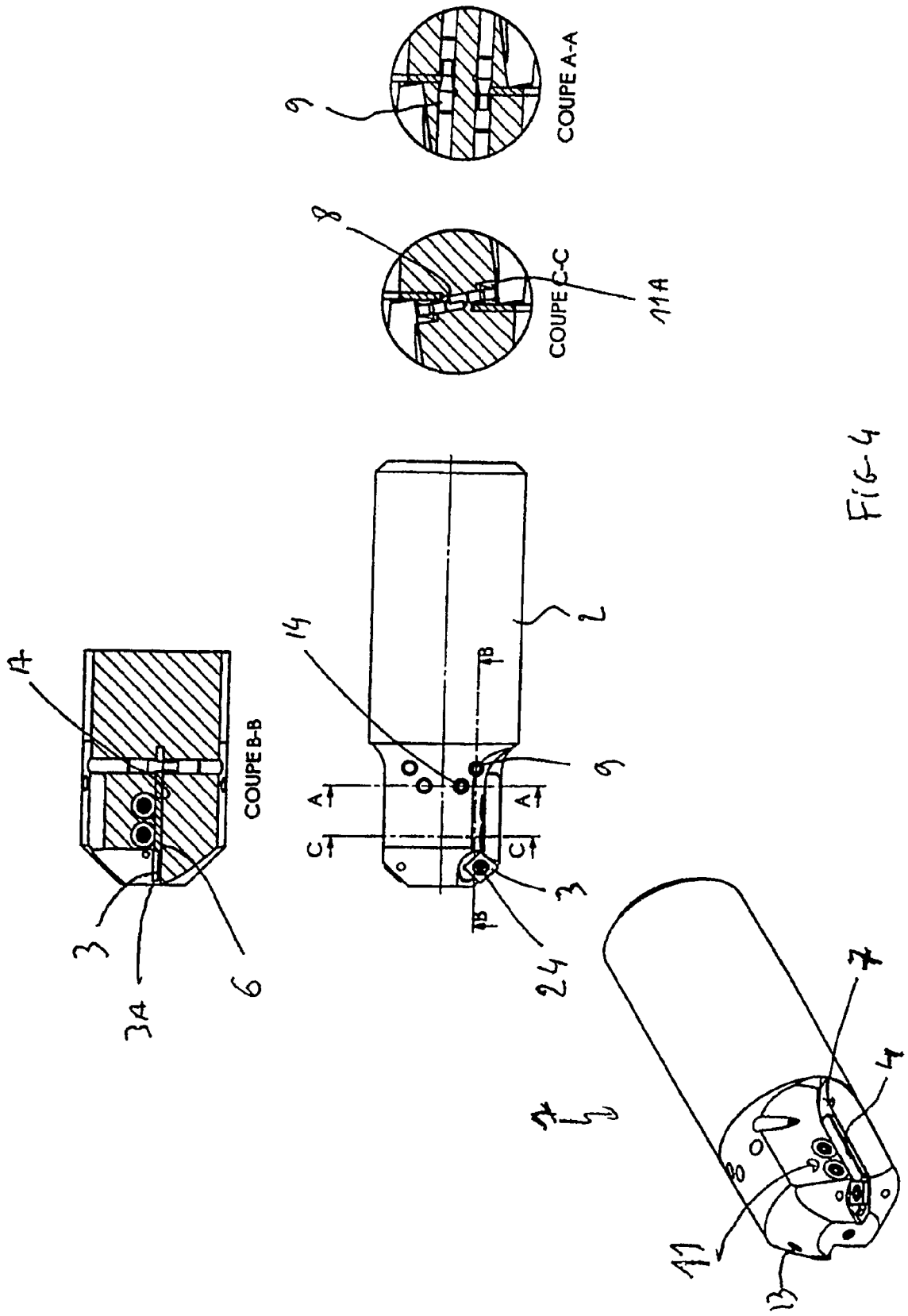

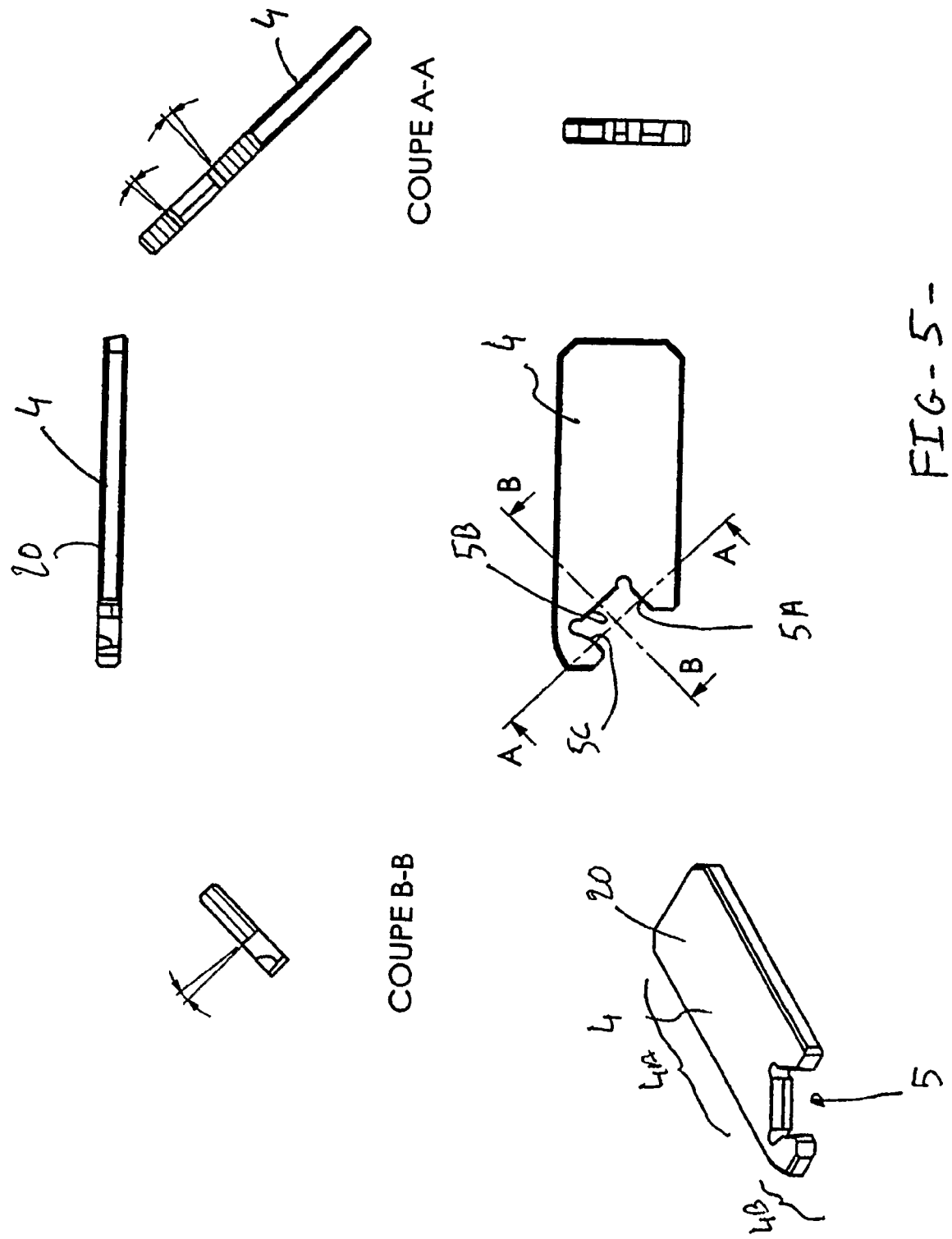

MACHINE TOOL WITH A PLATE WITH ELASTIC PROPERTIES FOR HOLDING THE CUTTER

The invention refers to a machine tool, employed in particular in order to machine a conical surface.

When manufacturing the engines in particular of automobiles, it is necessary to manufacture certain parts, such as the seatings of valves, with great precision.

To this end, use has been made for many years of tools which have their cutting edges oriented along the angle of the conical surface to be machined. Though it is possible to braze these cutters onto a tool body, then use is made most often of detachable machining cutters designed to be mounted onto a machine tool body in order that it should be possible to change these cutters rapidly when they are worn.

This also enables the machine tool body to be re-used.

The mounting of these cutters must be rigorous in order to enable correct manufacturing of the valve seating. Indeed, accurate positioning of the cutting edge is essential in order to obtain a good seal, and correct exhausting of the gases.

For the manufacturing these valve seatings, the cutter includes a cutting edge which is placed on a precise angular orientation in relation to the longitudinal axis of rotation of the tool.

To be more precise, a valve seating consists of three successive faces which are oriented differently.

It is therefore necessary to achieve correct angular positioning of the cutter in order to shape these faces. Radial positioning must also be achieved with precision.

It is known to use cutters which have several edges, allowing the cutter to be pivoted whenever an edge is worn.

There are also different types of mounting in which the machining cutters are held.

Thus, it is known (US-A-2004009046) to use a pressure element attached to the top of the cutter with a screw for retention of the pressure element which applies said pressure element with a certain force.

The tightening force of this screw is therefore not applied directly to the cutter.

The cutter partly rests in a stamping presented by the tool.

This hexagonal cutter thus bears onto a flat surface of the tool and in contact with three lateral bearing faces manufactured into the body of the tool. Two bearing faces form an angle whose bisecting line is perpendicular to the cutting edge.

No force, other than that of the reaction to the cutting force, holds the manufacturing cutter onto the bearing faces, and only the pressure of the clamp holds the cutter in position.

The working precision of this tool is therefore inadequate.

This type of tool, designed to use a single type of cutter, is therefore available from one single supplier only.

Moreover, if one of the lateral bearing faces of the stamping is damaged, the tool is no longer usable.

An aspect of the invention proposes to provide a solution to the particular problems.

To this end, it is desirable to provide a machine tool designed to be fitted with a cutter which is retained by a central screw, this tool being characterized in that it includes a plate which is removable in relation to the body of the tool, this plate having a cut-out for the positioning of a machining cutter, where this cut-out consists of two lateral faces, known as reference faces, and a third face which bears elastically against said manufacturing cutter.

BRIEF DESCRIPTION OF THE DRAWINGS

The invention will be properly understood with the aid of the following description, provided as an example that is not limited to what is shown in the drawings, which illustrate the following:

FIG. 2: different views of a machine tool with two cutters

FIG. 3: different views of a machine tool with one cutter and the means to adjust it FIG. 4: different views of a machine tool with two cutters and the means to adjust them.

FIG. 5: different views of details of the machine tool.

DETAILED DESCRIPTION

Figure 1:
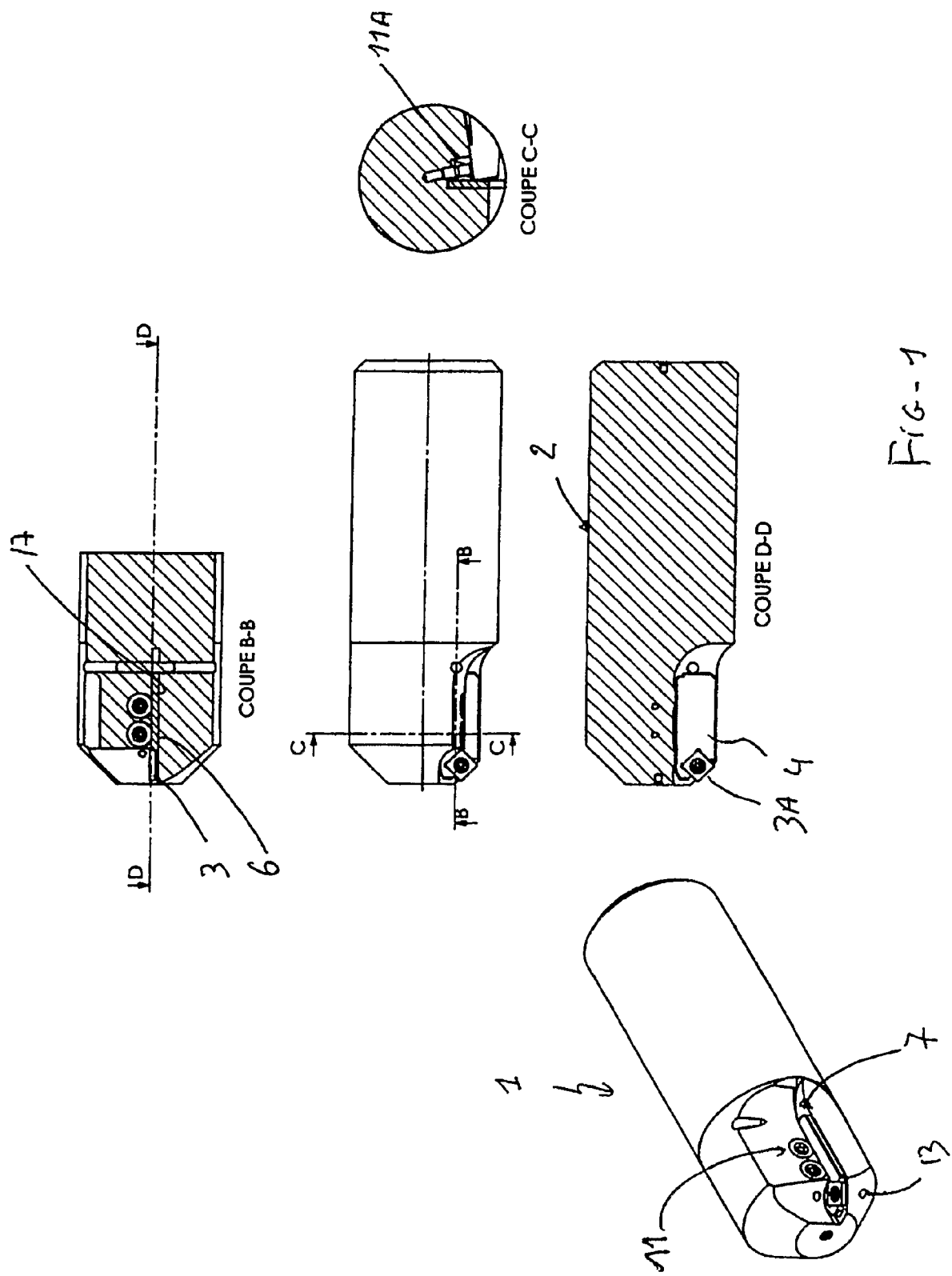
FIG. 1: different views of a machine tool with one cutter

Referring to the drawings, we see a machine tool (1) designed in particular to machine the seatings of valves.

This tool has a tool body (2) on which is mounted, at its extremity, at least one machining cutter (3).

This machining cutter is of the type with four faces, with a central hole for a retaining screw (24).

The tool body therefore includes a tapped hole for the retaining screw.

The tool body is designed to be held in a retaining chuck which is capable of rotating, or which is driven in rotation by a means which is appropriate to a machine tool.

In particular, the tool is designed to machine the seatings of valves, and it therefore works with a cutting edge (3A) that is inclined in relation to the longitudinal axis of the tool so as to machine a conical zone.

According to one characteristic, the tool includes a plate (4) which is removable in relation to the body of the tool, where this plate presents a cut-out (5) for the positioning of a machining cutter with a central hole, this cut-out having two lateral faces (5A, 5B), known as reference faces, and a third face (5C) which bears elastically against said machining cutter.

This pressure face (5C) will therefore apply the cutter onto one of the reference faces.

As an example, FIG. 5 shows a u-shaped cut-out with positioning faces at right angles, but the positioning faces can be oriented differently depending on the shape of the cutter and the pressure face.

This mounted plate (4) extends into a first zone (4A) along the longitudinal axis of the tool body and into a second zone (4B) which is approximately along the angle of attack of the cutting edge. It is in this second zone that the cut-out (5) is located. The cutter is therefore driven on two faces and held elastically against a third face.

The elastic pressure face is located toward the extremity of the tool.

It can be seen that the positioning and pressure faces are beveled from the upper face (20) and for part of the height.

The elastic pressure is obtained by local reduction of the material of the plate at the level of the branch of the cut-out (5) holding the pressure face.

The tool also has a reception plane (6) for the base of this plate and for the cutter. It is in this reception face that the tapped bore designed to be fitted with the retaining screw of the cutter is located.

In order to accommodate this plate, a groove (7) is created in the body, designed to take at least one part of the plate and to hold it in position.

This groove is delimited by the plane (6) receiving the cutter, a second face (17) overhanging this reception face, and a third face (8) at the bottom of the groove.

The bottom (8) of the groove can serve directly as the positioning end-stop for the plate.

A longitudinal end-stop (9) also serves for longitudinal positioning of the plate. As an example, this end-stop (9) is effected by a rod (10) partially passing through the body of the tool. In order to keep the plate applied onto the reception plane, the means of its retention (11) are provided, mounted on the part of the tool body which overhangs the reception plane and presenting one of the faces of the groove.

As an example, these means of retention comprise cylinders (11A) with a flat, each displaced by a screw, the axis of movement being inclined in relation to the plane containing the plate.

Tightening is achieved by moving the cylinder toward the bottom of the groove by means of a screw. A very effective securing of the plate, is then obtained, hence in an excellent quality of cut. This rigid mounting enables the quality of cut to be improved.

With this method, the body of the tool is simple to manufacture, as are the plates (4). The plate (4) can advantageously be made from harder material than that of the body of the tool.

By choosing the orientation of the cut-out, one can easily change the cutting angle.

Channels (13) extend through the body of the tool in order to spray cutting liquid for cooling of the cutter and of the machined part.

This tool can consist of several plates positioned angularly around its axis of rotation, where each plate can have a different angular orientation and different axial positioning in order to machine several conical surfaces at the same time.

As an alternative, the tool includes adjustment means employed to limit the positioning of the plate and therefore of the cutter.

As an example, the so-called longitudinal end-stop (9) can be displaced slightly moved by means of an adjustment screw.

Instead of it being the bottom of the groove that directly constitutes a radial positioning face for the plate, a mobile angular end-stop (14) enables the plate to be pivoted slightly, and therefore the cutter.

For example, this angular end-stop (14) is composed of a conical face held by a screw which engages perpendicularly with the reception plane of the plate.

This arrangement can be adopted both for the longitudinal end-stop and the angular end-stop.

Advantageously, the conical face of the angular or longitudinal end-stop bears onto a field of the plate which is inclined in relation to the plane containing either of the upper and lower faces of said plate so that the contact is linear and not intermittent.

The angle of inclination of the field of the plate (4) with relation to the plane containing the upper face will therefore depend on the choice of the angle of the conical part of the end-stop.

It is also possible to orientate the means adjusting so that the faces of the plate> onto which the adjustment end-stops bear are perpendicular to the plane of the upper face of the plate.

It is then merely necessary to orientate the movement axis of the adjusting screw in an appropriate manner.

It is also necessary that the contact should be linear.

This results in a very compact tool.

The tool can consist of one or more cutters positioned angularly so at to be able to machine several conical faces at the same time.

The invention claimed is:

1. A machine tool, the machine tool comprising a tool body, a cutter, a central screw for retaining the cutter, a plate which is removable relative to the tool body, the plate presenting a cut-out for positioning of the cutter, the cut-out having two lateral faces that both contact the cutter and a pressure face which presses elastically against the cutter, and wherein the lateral faces and the pressure face contact the cutter on three different sides.

2. A machine tool according to claim 1, wherein the plate extends into a first zone along a longitudinal axis of an axis of the tool body and into a second zone approximately along an angle of attack of the cutting edge, the cut-out being located in the second zone.

3. A machine tool according to claim 1, wherein elastic pressure of the pressure face is obtained by locally reducing an amount of material of the plate at a level of a branch of the cut-out comprising the pressure face.

4. A machine tool according to claim 1, comprising a groove in which the plate is partially located.

5. A machine tool according to claim 4, wherein the groove is delimited by a plane for reception of the cutter, a second face overhanging a reception face, and a third face at a bottom of the groove.

6. A machine tool according to claim 5, wherein the bottom of the groove forms an end-stop for positioning the plate.

7. A machine tool according to claim 4, comprising a rod forming a longitudinal end-stop for the plate.

8. A machine tool according to claim 1, comprising retention means for a part of the tool body overhanging a plane of the plate for reception of the cutter.

9. A machine tool according to claim 1, comprising means for angular adjustment of the plate.

10. A machine tool according to claim 1, comprising means for longitudinal adjustment of the plate.

11. A machine tool according to claim 10, wherein the contact between the means for longitudinal and angular adjustment is linear.

12. A machine tool according to claim 1, wherein the machine tool is a rotating tool.

* * * * *